United States Patent
Acharya et al.

(10) Patent No.: US 10,134,103 B2
(45) Date of Patent: Nov. 20, 2018

(54) GPU OPERATION ALGORITHM SELECTION BASED ON COMMAND STREAM MARKER

(71) Applicant: QUALCOMM Incorporated, San Diego, CA (US)

(72) Inventors: Anirudh Rajendra Acharya, San Diego, CA (US); David Rigel Garcia Garcia, North York (CA); Nigel Terence Poole, West Newton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/083,680

(22) Filed: Mar. 29, 2016

(65) Prior Publication Data

US 2017/0116701 A1    Apr. 27, 2017

Related U.S. Application Data (60) Provisional application No. 62/245,814, filed on Oct. 23, 2015.

(51) Int. Cl.
  *G06F 9/48*     (2006.01)
  *G06T 1/20*     (2006.01)
  *G06T 15/00*    (2011.01)

(52) U.S. Cl.
  CPC .......... *G06T 1/20* (2013.01); *G06F 9/48* (2013.01); *G06T 15/005* (2013.01)

(58) Field of Classification Search
  CPC .............................. G06T 15/005; G06T 1/20
  USPC ........................................................ 345/522
  See application file for complete search history.

(56) References Cited

U.S. PATENT DOCUMENTS

| 8,572,573 | B2 | 10/2013 | Baliga et al. | |
|---|---|---|---|---|
| 2006/0037020 | A1* | 2/2006 | Accapadi | G06F 9/5027 718/102 |
| 2008/0303835 | A1* | 12/2008 | Swift | G06T 15/005 345/522 |
| 2011/0225590 | A1* | 9/2011 | Thomson | G06F 9/4881 718/103 |
| 2013/0106881 | A1* | 5/2013 | Hendry | G06T 1/20 345/522 |

(Continued)

FOREIGN PATENT DOCUMENTS

WO    2014131171 A1    9/2014

OTHER PUBLICATIONS

International Search Report—PCT/US2016/049022—ISA/EPO—dated Dec. 21, 2016, 15 pp.

(Continued)

*Primary Examiner* — Jin Ge
(74) *Attorney, Agent, or Firm* — Shumaker & Sieffert, P.A.

(57) ABSTRACT

A method of data processing, the method comprising receiving, at a graphics processing unit (GPU), a command stream, the command stream including one or more commands to be performed by the GPU and at least one command stream marker, the at least one command stream marker indicating a workload type of the command stream, determining, by the GPU, an operation algorithm for the GPU based on the at least one command stream marker prior to executing the command stream, and executing, by the GPU, the command stream based on the operation algorithm.

20 Claims, 4 Drawing Sheets

(56) References Cited

U.S. PATENT DOCUMENTS

| | | | |
|---|---|---|---|
| 2013/0132711 A1* | 5/2013 | Shah | G06F 9/461 |
| | | | 712/228 |
| 2013/0238938 A1* | 9/2013 | Baliga | G06F 11/3632 |
| | | | 714/38.1 |
| 2014/0022263 A1* | 1/2014 | Hartog | G06T 1/20 |
| | | | 345/506 |
| 2014/0022266 A1 | 1/2014 | Metz et al. | |
| 2014/0184617 A1* | 7/2014 | Palmer | G06T 1/20 |
| | | | 345/506 |
| 2015/0002522 A1* | 1/2015 | Nalluri | G06T 1/60 |
| | | | 345/522 |
| 2015/0022538 A1 | 1/2015 | Munshi | |
| 2015/0277981 A1 | 10/2015 | Nalluri et al. | |
| 2016/0055611 A1* | 2/2016 | Manevitch | G06T 1/20 |
| | | | 345/501 |
| 2016/0140686 A1* | 5/2016 | Lueh | G06F 9/462 |
| | | | 345/522 |
| 2016/0307290 A1* | 10/2016 | Nalluri | G06T 1/20 |
| 2017/0061568 A1 | 3/2017 | Metz et al. | |

OTHER PUBLICATIONS

Partial International Search Report—PCT/US2016/049022—ISA/EPO—dated Nov. 4, 2016, 6 pp.
Response to the Written Opinion dated Dec. 21, 2016, in International Application No. PCT/US2016/049022, filed Aug. 10, 2017, 18 pp.
Second Written Opinion issued in International Application No. PCT/US2016/049022, dated Sep. 12, 2017, 6 pp.
International Preliminary Report on Patentability—PCT/US2016/049022 dated Feb. 2, 2018, 7 pp.

* cited by examiner

GPU OPERATION ALGORITHM SELECTION BASED ON COMMAND STREAM MARKER

This application claims the benefit of U.S. Provisional Application No. 62/245,814, filed Oct. 23, 2015, the entire content of which is incorporated by reference herein.

TECHNICAL FIELD

This disclosure relates to graphics processing, and more particularly, to the selection of an operation algorithm for a graphics processing unit (GPU).

BACKGROUND

Mobile devices are powered by batteries of limited size and/or capacity. Typically, mobile devices are used for making phone calls, checking email, recording/playback of a picture/video, listening to radio, navigation, web browsing, playing games, managing devices, and performing calculations, among other things. Many of these actions utilize a graphics processing unit (GPU) to perform some tasks. Example GPU tasks include the rendering of content to a display and performing general compute computations (e.g., in a general purpose GPU (GPGPU) operation). Therefore, the GPU is typically a large consumer of power in mobile devices. As such, it is beneficial to manage the power consumption of the GPU, especially in mobile devices, in order to prolong battery life.

SUMMARY

In general, the disclosure describes techniques for operation algorithm selection for a graphics processing unit (GPU). Techniques of this disclosure may include inserting command stream markers into a GPU command stream in order to characterize the workload type represented by the command stream. The GPU may then use the command stream markers to select an operation algorithm for the GPU, including the selection of one or more preemption processes based on the workload type.

In one example, a method of data processing comprises receiving, at a graphics processing unit (GPU), a command stream, the command stream including one or more commands to be performed by the GPU and at least one command stream marker, the at least one command stream marker indicating a workload type of the command stream, determining, by the GPU, an operation algorithm for the GPU based on the at least one command stream marker prior to executing the command stream, and executing, by the GPU, the command stream based on the operation algorithm.

In another example of the disclosure, an apparatus configured to process data comprises a memory configured to store a command stream, and a GPU, the GPU comprising a command processor configured to receive the command stream, the command stream including one or more commands to be performed by the GPU and at least one command stream marker, the at least one command stream marker indicating a workload type of the command stream, a processing unit configured to determine an operation algorithm for the GPU based on the at least one command stream marker prior to executing the command stream, and a plurality of processing units configured to execute the command stream based on the operation algorithm.

In another example of the disclosure, an apparatus configured for data processing, the apparatus comprises means for receiving a command stream, the command stream including one or more commands to be performed by a GPU and at least one command stream marker, the at least one command stream marker indicating a workload type of the command stream, means for determining an operation algorithm for the GPU based on the at least one command stream marker prior to executing the command stream, and means for executing the command stream based on the operation algorithm.

This disclosure also describes a computer-readable storage medium storing instructions that, when executed, cause one or more processors of a device to receive a command stream, the command stream including one or more commands to be performed by a GPU and at least one command stream marker, the at least one command stream marker indicating a workload type of the command stream, determine an operation algorithm for the GPU based on the at least one command stream marker prior to executing the command stream, and execute the command stream based on the operation algorithm.

The details of one or more examples are set forth in the accompanying drawings and the description below. Other features, objects, and advantages will be apparent from the description, drawings, and claims.

DETAILED DESCRIPTION

This disclosure is directed to techniques for operation algorithm selection in a graphics processing unit (GPU). GPUs typically have multiple dedicated hardware, firmware-programmable, and/or software-programmable processing units configured to handle various workloads efficiently. For example, a GPU may include processing units for handling compute applications (e.g., non-graphics operations). Such processing units may handle the dispatching of threads/workgroups, executing compute workloads, tracking execution progress, synchronization, and so forth. As another example, a GPU may include processing units for handling graphics applications. Such processing units may handle typical rendering operations, rendering mode specific operations (e.g., binning), and other operations related to graphics processing.

GPUs generally operate according to an operation algorithm. An operation algorithm may be implemented as software, firmware, or dedicated hardware, or a combination thereof, that controls how a GPU operates. Aspects of GPU operation controlled by an operation algorithm may include configuration optimization for rendering, power management processes, and processes performed during a preemption request of a GPU process. However, since a GPU may be directed to perform tasks for different types of general workloads (e.g., compute or graphics workloads) and/or for different types of graphics workloads (e.g., 3D graphics rendering, 2D graphics renderings, direct rendering, binning rendering), a single operation algorithm for a GPU may not be optimal.

A GPU may include a command processor or a command streamer that reads in commands from a command buffer to be executed by the GPU. However, the command processor of the GPU does not have any mechanism for determining what type of workload is represented by the command that it reads. In some examples, a GPU driver may supply the commands to the GPU, and the GPU driver may be able to determine the workload type of the commands. However, the GPU driver only stores the commands in the command buffer and does not have any indication of when the GPU will be executing a specific command buffer or a specific set of a commands in a command buffer. That is, the GPU driver is not configured to determine the current running mode of the GPU (e.g., what workload type the GPU is currently executing).

In view of these drawbacks, this disclosure proposes techniques whereby command stream markers may be included in a command stream to be executed by a GPU. The command stream markers may provide indications of the type of workload represented by the command stream. The GPU may then select a particular operation algorithm for the GPU based on the indication of workload type by the command stream marker. In this way, the operation of the GPU may be more finely tailored to the specific workload being executed.

Figure 1:
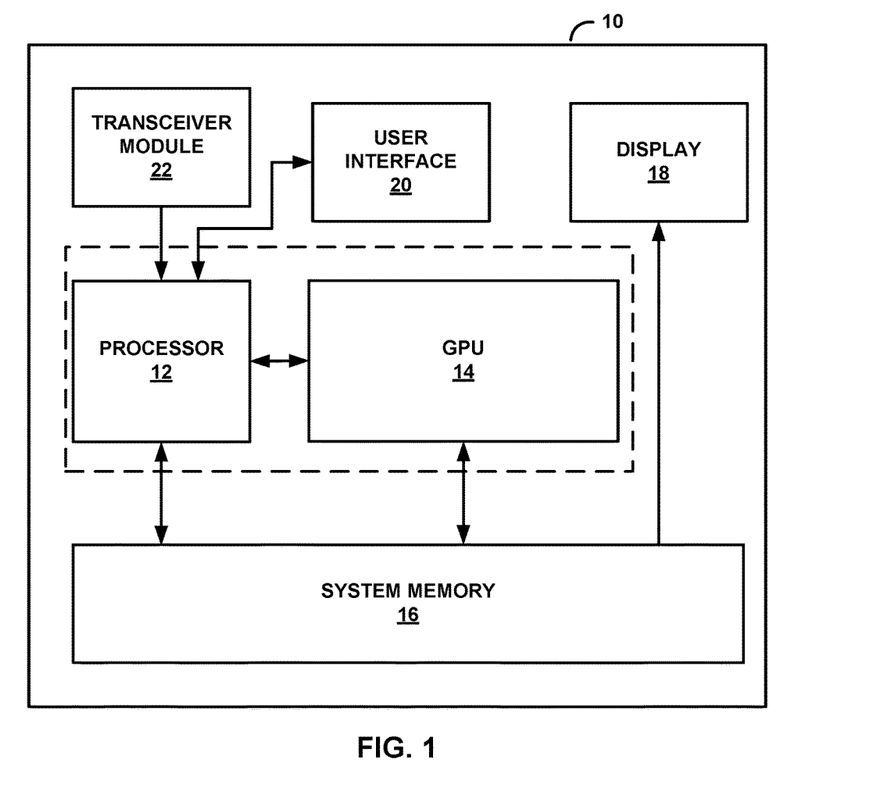
FIG. 1 is a block diagram illustrating an example device for processing data in accordance with one or more example techniques described in this disclosure.

FIG. 1 is a block diagram illustrating an example device for processing data in accordance with one or more example techniques described in this disclosure. FIG. 1 illustrates device 10, examples of which include, but are not limited to, video devices such as media players, set-top boxes, mobile devices such as mobile telephones, personal digital assistants (PDAs), desktop computers, laptop computers, gaming consoles, video conferencing units, tablet computing devices, and the like.

In the example of FIG. 1, device 10 includes processor 12, GPU 14, and system memory 16. In some examples, such as examples where device 10 is a mobile device, processor 12 and GPU 14 may be formed as an integrated circuit (IC), such as a system-on-chip (SoC). For example, the IC may be formed as a processing chip within a chip package. In some examples, processor 12 and GPU 14 may be housed in different integrated circuits (i.e., different chip packages) such as examples where device 10 is a desktop or laptop computer with a separate graphics card that houses GPU 14. However, it may be possible that processor 12 and GPU 14 are housed in different integrated circuits in examples where device 10 is a mobile device.

Examples of processor 12 and GPU 14 include, but are not limited to, one or more digital signal processors (DSPs), general purpose microprocessors, application specific integrated circuits (ASICs), field programmable logic arrays (FPGAs), or other equivalent integrated or discrete logic circuitry. Processor 12 may be the central processing unit (CPU) of device 10. In some examples, GPU 14 may be specialized hardware that includes integrated and/or discrete logic circuitry that provides GPU 14 with massive parallel processing capabilities suitable for graphics processing. In some instances, GPU 14 may also include general-purpose processing capabilities, and may be referred to as a general-purpose GPU (GPGPU) when implementing general-purpose processing tasks (e.g., so-called "compute" tasks).

For purposes of illustration, the techniques described in this disclosure are described with respect to GPU 14. However, the techniques described in this disclosure are not so limited. The techniques described in this disclosure may be extended to other types of processing units.

Processor 12 may execute various types of applications. Examples of the applications include web browsers, web applications, e-mail applications, spreadsheets, video games, media playback applications, or other applications that generate viewable objects for display. System memory 16 may store instructions for execution of the one or more applications. The execution of an application on processor 12 causes processor 12 to produce graphics data for image content that is to be displayed. Processor 12 may transmit graphics data of the image content to GPU 14 for further processing. GPU 14 may be configured to perform 2D and/or 3D graphics processing.

In some non-graphics related compute examples, processor 12 may generate data that is better suited to be processed by GPU 14. Such data may not be needed for graphics or display purposes. For instance, processor 12 may output, to GPU 14, data on which matrix operations need to be performed, and GPU 14 may in turn perform the matrix operations.

In general, processor 12 may offload processing tasks to GPU 14, such as tasks that may benefit from massive parallel operations. As one example, graphics processing benefits from massive parallel operations, and processor 12 may offload such graphics processing tasks to GPU 14. However, other operations such as matrix operations may also benefit from the parallel processing capabilities of GPU 14. In these examples, processor 12 may leverage the parallel processing capabilities of GPU 14 to cause GPU 14 to perform non-graphics related operations.

Processor 12 may communicate with GPU 14 in accordance with a particular application processing interface (API). Examples of such APIs include DirectX® by Microsoft®, OpenGL® or OpenGL ES® by the Khronos group, and OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and processor 12 and GPU 14 may utilize any technique for communication.

System memory 16 may be the memory for device 10, and may comprise one or more computer-readable storage media. Examples of system memory 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, system memory 16 may include instructions that cause processor 12 and/or GPU 14 to perform the functions ascribed in this disclosure to processor 12 and GPU 14. Accordingly, system memory 16 may be a computer-readable storage medium having instructions stored thereon that, when executed, cause one or more processors (e.g., processor 12 and GPU 14) to perform various functions.

In some examples, system memory 16 is a non-transitory storage medium. The term "non-transitory" may indicate that the storage medium is not embodied in a carrier wave or a propagated signal. However, the term "non-transitory" should not be interpreted to mean that system memory 16 is non-movable or that its contents are static. As one example, system memory 16 may be removed from device 10, and moved to another device. As another example, memory, substantially similar to system memory 16, may be inserted into device 10. In certain examples, a non-transitory storage medium may store data that can, over time, change (e.g., in RAM).

Device 10 may also include display 18, user interface 20, and transceiver module 22. Device 10 may include additional modules or units not shown in FIG. 1 for purposes of clarity. For example, device 10 may include a speaker and a microphone, neither of which are shown in FIG. 1, to effectuate telephonic communications in examples where device 10 is a mobile wireless telephone. Furthermore, the various modules and units shown in device 10 may not be necessary in every example of device 10. For example, user interface 20 and display 18 may be external to device 10 in examples where device 10 is a desktop computer. As another example, user interface 20 may be part of display 18 in examples where display 18 is a touch-sensitive or presence-sensitive display of a mobile device.

Display 18 may comprise a liquid crystal display (LCD), a cathode ray tube (CRT) display, a plasma display, a touch-sensitive display, a presence-sensitive display, or another type of display device. Examples of user interface 20 include, but are not limited to, a trackball, a mouse, a keyboard, and other types of input devices. User interface 20 may also be a touch screen and may be incorporated as a part of display 18.

Transceiver module 22 may include circuitry to allow wireless or wired communication between device 10 and another device or a network. Transceiver module 22 may include modulators, demodulators, amplifiers and other such circuitry for wired or wireless communication.

In the techniques described in this disclosure, a first processing unit (e.g., processor 12) offloads certain tasks to a second processing unit (e.g., GPU 14). To offload tasks, processor 12 outputs commands to be executed by GPU 14 and data that are operands of the commands (e.g., data on which the commands operate) to system memory 16 and/or directly to GPU 14. GPU 14 receives the commands and data, from processor 12 and/or from system memory 16, and executes the commands. In some examples, rather than storing commands to be executed by GPU 14, and the data operands for the commands, in system memory 16, processor 12 may store the commands and data operands in a local memory that is local to the IC that includes GPU 14 and processor 12 and is shared by both processor 12 and GPU 14. In general, the techniques described in this disclosure are applicable to the various ways in which processor 12 may make available the commands for execution on GPU 14, and the techniques are not limited to the above examples.

In some examples, such as those where processor 12 stores commands to be executed by GPU 14 in memory (e.g., system memory 16 or a local memory), processor 12 may output memory address information identifying a group of commands that GPU 14 is to execute. The group of commands that GPU 14 is to execute is referred to as a command stream. In examples where processor 12 directly outputs the commands to GPU 14, the command stream includes those commands that processor 12 instructs GPU 14 to execute immediately.

There may be various ways in which processor 12 may group commands into command streams. As one example, a group of commands includes all the commands needed by GPU 14 to render one frame. As another example, a group of commands may be so-called "atomic commands" that are to be executed together without GPU 14 switching to other commands. Other ways to group commands into command streams that are submitted to GPU 14 may be possible, and the disclosure is not limited to the above example techniques.

In accordance with the techniques of this disclosure, as will be described in more detail below, processor 12 may be configured to include command stream markers in a command stream. The command stream markers include information that provides an indication of the type of future workload that will be performed by GPU 14. As will be explained in more detail below, the command markers may be, for example, included at the beginning of a command stream and indicate the type of workload of the commands in the particular command stream. Workload types may include a compute workload (e.g., a non-graphics command stream executed by the GPU) and a graphics workload. The command stream marker may include additional information providing a further characterization of a graphics workload. For example, the command stream marker may further indicate if the graphics command stream is a 2D graphics workload or a 3D graphics workload. In other examples, the command stream markers may further indicate whether the graphics workload is performed according to a direct rendering mode or a binning rendering mode. Command stream markers may include other workload types and/or additional information characterizing a workload type may be present.

In some examples, the command stream markers (e.g., the indications of workload type) may be included directly in the command stream. In other examples, the command stream markers in the command stream may comprise pointers, indices, or other indirect indications that inform GPU 14 of where, in memory to access the information indicating the workload type (e.g., in memory). GPU 14 (e.g., a command processor in GPU 14) may be configured to retrieve the command stream markers from the command stream and adjust an operation algorithm of one or more components of GPU 14 based on the command stream markers.

GPUs generally operate according to an operation algorithm. An operation algorithm may be implemented as software, firmware, or dedicated hardware that controls how a GPU operates. Aspects of GPU operation controlled by an operation algorithm may include configuration optimization for rendering, power management processes, and processes performed during preemption request of a GPU process. In accordance with examples of the disclosure described in more detail below, GPU 14 may be configured to determine a preemption process based on the indication of workload type provided by a command stream marker.

In simple terms, a preemption request made to GPU 14 is a request made by another entity of a graphics processing system (e.g., an application or GPU driver executing on processor 12) to stop current processing of a command buffer/command stream in favor of another, higher priority operation (e.g., another command buffer/command stream) that needs GPU processing. Often, such preemption requests will originate from an operating system. Some example techniques for preemption of graphics processing rely on the use of so-called "safe points." That is, if GPU 14 receives a request to preempt current processing, the GPU continues processing up to a particular point (e.g., a particular point in a command buffer) and saves information concerning the state of processing at that point. Such information may include the point in the command buffer at which processing was stopped and should be restarted, the contents of any buffer that receives the output of GPU processing, and the contents of one or more buffers that may be used as input data for any GPU processing at the point in the command.

Other example techniques for preemption may include discarding all output generated by executing a particular set of commands in a command buffer, and restarting execution of the command buffer at the beginning after the higher priority task for which preemption was requested is completed. It should be understood that the techniques of this disclosure may be applicable for use with any preemption techniques.

However, using the same techniques for when and how to save a "safe point," to discard the output of the execution of a set of commands, and/or to restart processing may be inefficient for different types of workloads. As will be explained in more detail below. GPU 14 may use the command stream markers to select an operation algorithm, including a preemption process, which is preferable for the particular workload type indicated by the command stream marker.

As such, according to one example of the disclosure, device 10 is an example of a device configured to receive, at GPU 14, a command stream, the command stream including one or more commands to be performed by GPU 14 and at least one command stream marker, the at least one command stream marker indicating a workload type of the command stream, determine, by GPU 14, an operation algorithm for GPU 14 based on the at least one command stream marker prior to executing the command stream, and execute, by GPU 14, the command stream.

Figure 2:
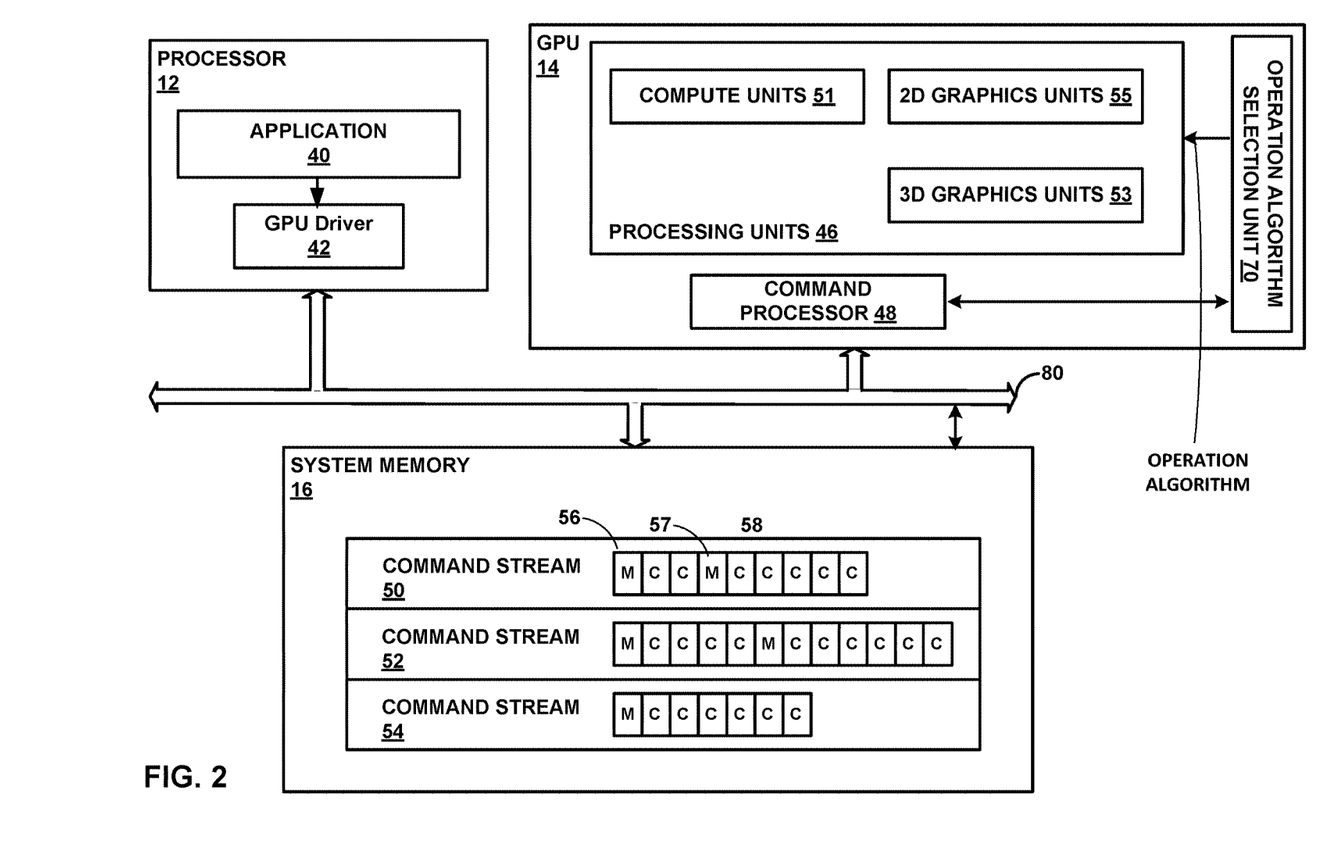
FIG. 2 is a block diagram illustrating components of the device illustrated in FIG. 1 in greater detail.

FIG. 2 is a block diagram illustrating components of the device illustrated in FIG. 1 in greater detail. As shown in FIG. 2, processor 12 may be configured to execute an application 40 and a GPU driver 42. Application 40 may be any application where execution by processor 12 causes one or more commands to be offloaded to GPU 14 for processing. Examples of application 40 may include an application that causes processor 12 to offload 3D rendering commands to GPU 14 (e.g., a video game application), an application that causes processor 12 to offload 2D rendering commands to GPU 14 (e.g., a user interface application), or an application that causes processor 12 to offload general compute tasks to GPU 14 (e.g., a GPGPU application).

As described above, processor 12 may offload tasks to GPU 14 due to the massive parallel processing capabilities of GPU 14. For instance, GPU 14 may be designed with a single instruction, multiple data (SIMD) structure. In the SIMD structure, processing unit 46 of GPU 14 may include a plurality of SIMD processing elements, where each SIMD processing element executes the same commands, but on different data.

A particular command executing on a particular SIMD processing element is referred to as a thread. Each SIMD processing element may be considered as executing a different thread because the data for a given thread may be different; however, the thread executing on a processing element is the same command as the command executing on the other processing elements. In this way, the SIMD structure allows GPU 14 to perform many tasks in parallel (e.g., at the same time).

To avoid confusion, this disclosure uses the term "command" to generically refer to a process that is executed by processing units 46 of GPU 14. A command may include an actual command, constituent sub-commands (e.g., memory call commands), a thread, or other ways in which GPU 14 performs a particular function. Processing units 46 may include one or more shader cores (e.g., programmable processing units including an arithmetic logic unit) or one or more units of fixed-function pipelines. In some examples, a portion of processing units 46 may be dedicated to 2D graphics processing, another portion of processing units 46 may be dedicated to 3D graphics processing, and still another portion of processing unit 46 may be dedicated to compute applications.

As depicted in FIG. 2, processing unit 46 may be logically divided into compute units 51, 2D graphics unit 52, and 3D graphics unit 53. It should be understood, that the division of processing unit 46 into these units is not meant to indicate that each of compute units 51, 2D graphics unit 52, and 3D graphics unit 53 contain separate independent hardware units. Rather, as one example, compute units 51 is meant to represent all of processing units 46 that may be used for compute applications. Compute units 51 may contain particular processing units that are unique to only compute applications and may also contain processing units that are also used for 2D graphics and/or 3D graphics applications. For example, compute units 51 may include processing units configured to handle dispatching threads/workgroups, executing compute workloads, tracking execution progress, synchronization, etc. Likewise, 2D graphics units 55 may contain particular processing units that are unique to only 2D graphics applications and may also contain processing units that are also used for 3D graphics and/or compute applications. Similarly, 3D graphics units 53 may contain particular processing units that are unique to only 3D graphics applications and may also contain processing units that are also used for 2D graphics and/or compute applications. For example, 2D graphics units 55 and/or 3D graphics units 53 may include processing units configured to handle typical rendering operations, tile rendering modules configured to performing binning operations, fixed-function graphics pipelines, and the like.

Processor 12 may be configured to group two or more commands into command streams. FIG. 2 shows command streams 50, 52, and 54 stored in system memory 16. Command "C" 58 represents one command in command stream 50. In some examples, each of the command streams may represent a separate type of workload (e.g., 3D graphics rendering, 2D graphics rendering, compute task, etc.). In other examples, a command stream may include commands for two or more different types of workloads. In accordance with the techniques of this disclosure, processor 12 (e.g., through execution of GPU driver 42) may be configured to include a command stream marker(s) in the command stream. The command stream marker may be one or more syntax elements that indicates the type of workload that follows the marker in the command stream. Command stream markers "M" 56 represents one or more command stream markers in command stream 50.

In some examples, the command stream markers M generated by GPU driver 42 characterize a type of workload of a command stream. Example command stream markers include information (e.g., syntax elements) that indicate, among other things, whether the command stream is a compute application (e.g., an application where GPU 14 is used to make calculations and not necessarily display any images) or a graphics application (e.g., an application whereby one or more images are rendered and displayed), if a graphics application is 2D or 3D graphics rendering, and/or if a graphics application uses direct rendering or binning rendering. Direct rendering is a rendering technique whereby the entirety of the frame is rendered at the same time. Binning rendering is a rendering technique whereby a frame is divided into sections (e.g., bins or tiles) and each section is rendered separately. In general, on a mobile device or any device with limited fast GPU memory (GMEM), direct rendering may be a slower, more power intensive operation as many accesses to system memory 16 may be made over bus 80.

Figure 3:
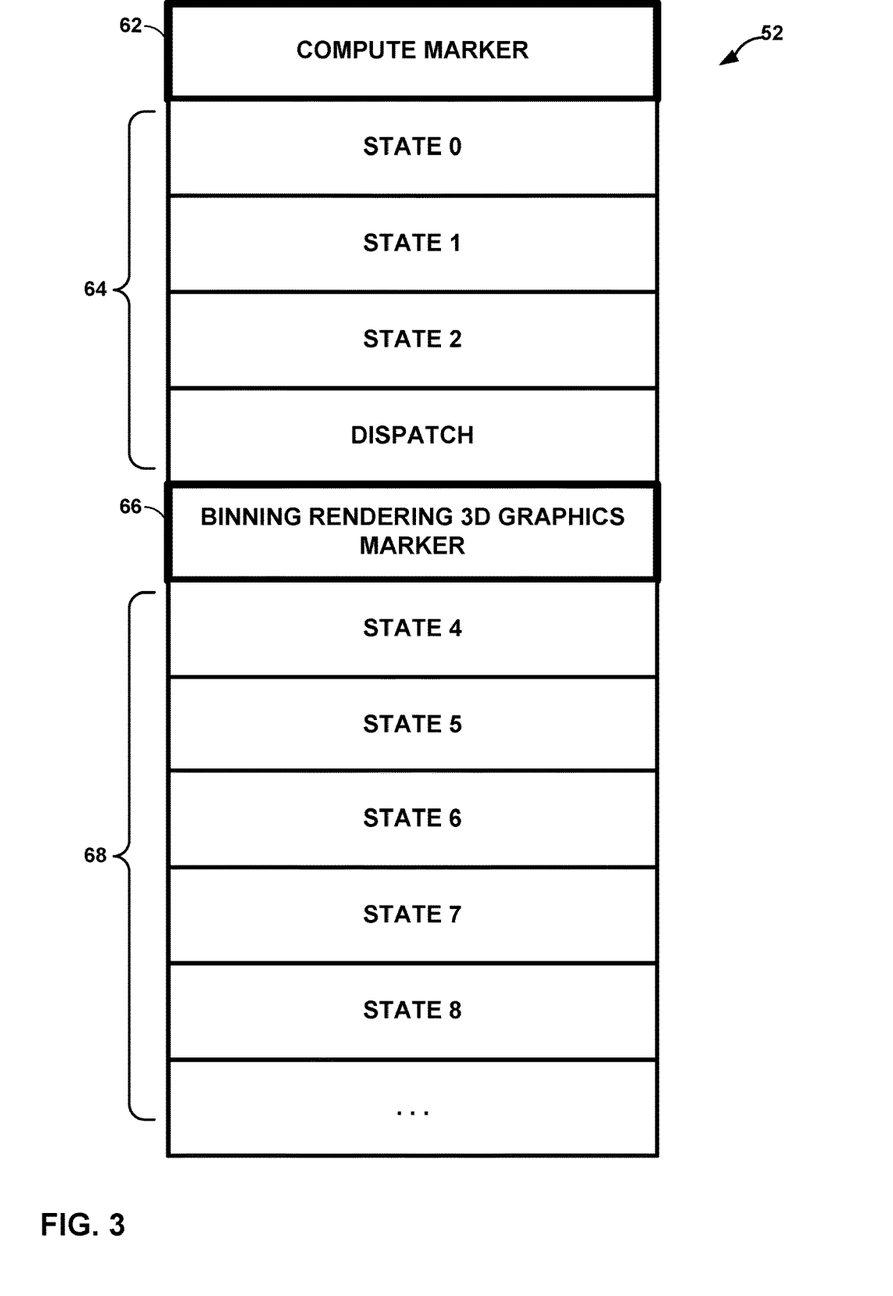
FIG. 3 is a conceptual diagram showing a command stream in accordance with the techniques of this disclosure.

FIG. 3 is a conceptual diagram showing command stream 52 in more detail. Command stream 52 may include a command stream marker 62 indicating that the following commands 64 are for a compute type workload. Commands 64 may include commands that are executed by a current "state" of GPU 14. A state may indicate what processing units of a GPU are executing a particular command. Commands 64 may also include a dispatch command. A dispatch command is a type of command used for compute workloads and is generally analogous to a "drawcall" for 3D rendering. A dispatch command executes compute commands for a certain number of threads. At the end of commands 64 for the compute application, GPU driver 42 may insert a binning rendering 3D graphics marker 66 to indicate the start of a new workload type in command stream 52. Commands 68 represent commands for executing a 3D graphics rendering application using a binning rendering mode.

Returning to FIG. 2, command processor 48 and operation algorithm selection unit 70 of GPU 14 may use the command stream markers inserted into command streams 50, 52, and 54 to select an operation algorithm for GPU 14. In some examples, command processor 48 and/or operation algorithm selection unit 70 may be implemented as a fixed function state machine. In other examples, command processor 48 and/or operation algorithm selection unit 70 may be implemented as a combination of one or more fixed function hardware blocks working in combination with a programmable processor executing software and/or firmware. In other examples, command processor 48 and/or operation algorithm selection unit 70 may be completely implemented as a processor executing software and/or firmware.

GPU driver 42 may be configured to determine one or more of the command stream markers described above from application 40, from a user setting, and/or from an analysis of the commands in command streams 50, 52, and 54. In one example, the command stream markers determined by GPU driver 42 may be a static list that is predetermined and made available to both GPU driver 42 and GPU 14. In one example, GPU driver 42 may be configured to determine command stream markers using an API monitoring process (e.g., by monitoring API calls made by application 40) and then insert the determined command stream markers into the bitstream.

As one example, a "drawcall" command may indicate a 3D graphics workload type. Example API drawcalls may include glDraw for the OpenGL API, Draw for the Direct3D API, or vkCmdDraw for the Vulkan API. As another example a glBlitFramebuffer or glCopyPixels command from the OpenGL API may indicate a 2D graphics workload type. As another example, a "dispatch" command may indicate a compute workload type. Example API dispatch commands may include enqueueNDRange for the OpenCL API, glDispatchCompute for the OpenGL API, Dispatch for the DirectCompute API, or vkCmdDispatch for the Vulkan API.

In some examples, GPU driver 42 is configured to determine which of a binning rendering mode or a direct rendering mode for a 3D graphics workload type. As such, GPU driver 42 may be configured to insert a command stream marker indicating the rendering mode based on the determination made by GPU driver 42.

FIG. 2 shows command stream 50 that may include command stream markers 56 and 57. In one example of the disclosure, command stream marker 56 may be related to the workload represented by all commands "C" that follow command stream marker 56 and precede the next command stream marker in command stream 50 (e.g., command stream marker 57). Command stream marker 57 may then apply to the workload represented by all of one or more commands "C" that follow command stream marker 57 and precede the next command stream marker in the command stream. In other examples, such as command stream 54, a command stream may only have one command stream marker, for the entire command stream. In other examples, a command stream may include multiple, different workloads, and each workload may have its own related command stream marker.

After processor 12 stores the generated commands and command stream markers in system memory 16, processor 12 makes available the commands for execution by GPU 14. For instance, processor 12 communicates to GPU 14 the memory addresses of a set of the stored commands and their operand data, where GPU 14 is to execute the set of commands, and information indicating when GPU 14 is to execute the set of commands. In this way, processor 12 submits commands to GPU 14 for execution.

As illustrated in FIG. 2, processor 12 may also execute GPU driver 42. In addition to inserting command stream markers into command streams 50, 52, and 54, GPU driver 42 may be configured to provide a mechanism for processor 12 and GPU 14 to communicate with one another. For instance, when processor 12 offloads graphics or non-graphics (e.g., compute) processing tasks to GPU 14, processor 12 offloads such processing tasks to GPU 14 via GPU driver 42. For example, when processor 12 outputs information indicating the amount of commands GPU 14 is to execute, GPU driver 42 may be the unit of processor 12 that outputs the information to GPU 14.

GPU driver 42 may be configured in accordance with an application processing interface (API); although GPU driver 42 does not need to be limited to being configured in accordance with a particular API. In an example where device 10 is a mobile device, GPU driver 42 may be configured in accordance with the OpenGL ES API. The OpenGL ES API is specifically designed for mobile devices. In an example where device 10 is a non-mobile device, GPU driver 42 may be configured in accordance with the OpenGL API.

When a command stream (e.g., command streams 50, 52, and/or 54) are made available to GPU 14 for processing, command processor 48 may be configured to access a command stream from system memory 16 via bus 80. Command processor 48 may also retrieve the operand data for the commands from system memory 16 or directly from processor 12. Command processor 48 may determine which commands are to be executed by particular portions of processing units 46.

In accordance with one example technique of this disclosure, command processor 48 may be configured to parse command stream 50 and communicate, or otherwise make available, command stream marker(s) 56 to operation algorithm selection unit 70. Operation algorithm selection unit 70 may be configured to read the indications in command stream marker(s) 56 and determine an operation algorithm for GPU 14 based on the command stream marker 56 prior to processing unit 46 of GPU 14 executing the commands in the command stream. As mentioned above, in the context of this disclosure, an operation algorithm may include any technique or set of techniques used to control the operation of GPU 14, including optimization for rendering, power management processes, and processes performed during preemption request of a GPU process.

Once command stream markers are decoded by command processor 48 (or other similar processing unit that processes GPU commands), operation algorithm selection unit 70 (or command processor 48) may make the following example determination based on the workload type indicated by the command stream markers. In the case that the command stream marker(s) is a compute workload marker, command processor 48 and/or operation algorithm selection unit 70 may interact with compute units 51 to establish an operation algorithm for the current compute workload. For example, for preemption operations, command processor 48 and/or operation algorithm selection unit 70 may instruct compute units 51 to be reactive to preemption operation (e.g., a preemption request) as soon as the workload is characterized as being of a compute type. For example, upon receipt of a preemption request, compute units 51 are configured to stop dispatching more threads/workgroups, stop compute workload execution, and prepare to be switched to another task (e.g., another type of workload). In some examples, compute units 51 may be configured to stop execution of a compute workload at a workload boundary in response to a preemption request. A state of the current compute workload may be saved, and then restarted at that state when the higher priority application for which preemption was requested has finished.

In the case that the command stream marker(s) is a graphics workload marker, command processor 48 and/or operation algorithm selection unit 70 may instruct 2D graphics units 55 and/or 3D graphics units 53 to be reactive to preemption operations (e.g., preemption requests) on encountering the appropriate graphics command stream marker. 2D graphics units 55 and/or 3D graphics units 53, to service a preemption request, may be configured to ensure the workload being executed could be preempted at a deterministic boundary (e.g., after completing a Drawcall) that was already in progress or after finishing a geometry binning operation if tiled rendering mode (binning rendering mode) is active. In some examples, command processor 48 and/or operation algorithm selection unit 70 may instruct 2D graphics units 55 and/or 3D graphics units 53 not to respond to preemption requests for particular types of graphics workloads. In other examples, command processor 48 and/or operation algorithm selection unit 70 may use command stream markers 58 to perform a power management process. In other examples, command processor 48, itself, performs according to the preemption algorithm. That is, command processor 48 may be configured to respond to preemption requests in accordance with the operation algorithm and issue instructions based on the operation algorithm to direct the actions of compute units 51, 2D graphics units 55, and/or 3D graphics units 53.

It should be understood that command processor 48 and/or operation algorithm selection unit 70 may be configured to receive, analyze, and use command stream marker(s) 56 in a manner to determine an operation algorithm before executing the command stream 50. That is, the characterization of the workload type represented by command stream marker(s) 56 does not necessarily prescribe a specific course of action to be taken by command processor 48 and/or operation algorithm selection unit 70. Command processor 48 and/or operation algorithm selection unit 70 may use command stream marker(s) 56 alone to determine how to determine an operation algorithm, or may use command stream marker(s) 56 in combination with other factors.

Figure 4:
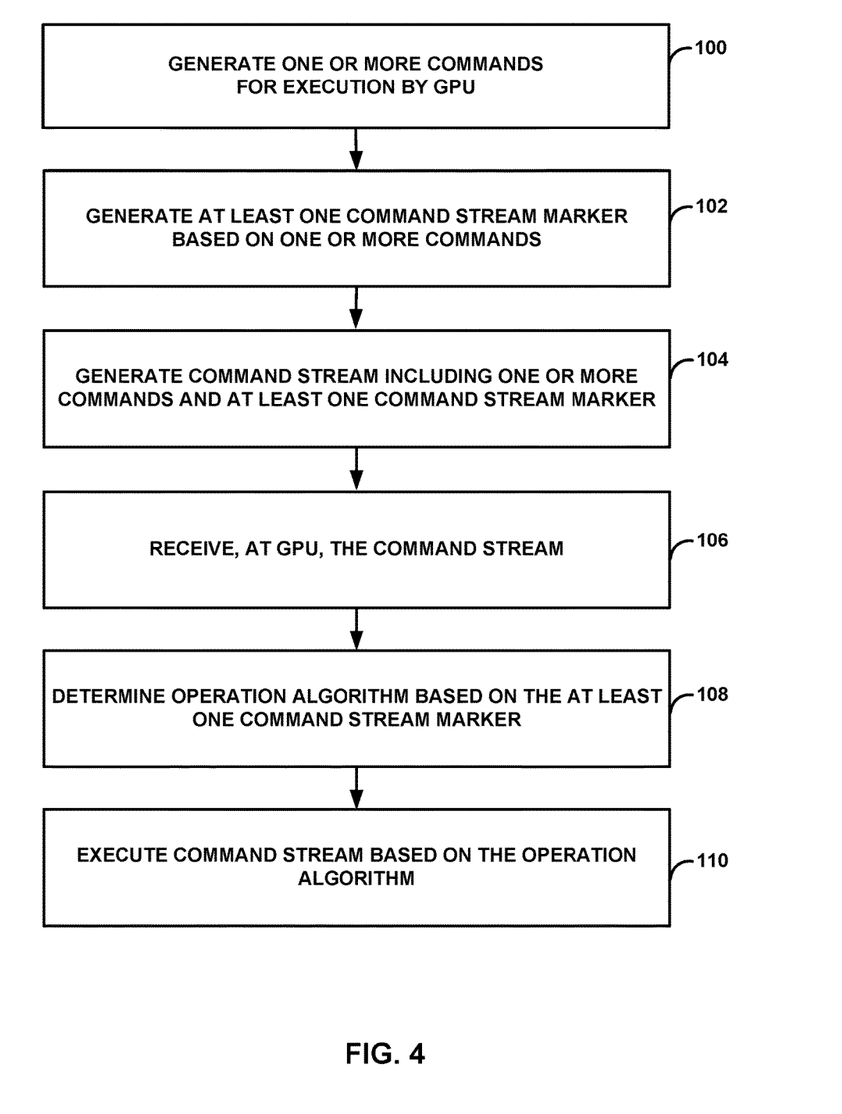
FIG. 4 is a flowchart illustrating an example method according to techniques described in this disclosure.

FIG. 4 is a flowchart illustrating an example method according to techniques described in this disclosure. The techniques of FIG. 4 may be implemented by one or more structures of processor 12 and GPU 14. In one example of the disclosure, processor 12 may be configured to generate one or more commands for execution by GPU 14 (100), generate at least one command stream marker based on the one or more commands (102), and generate the command stream to include the one or more commands and the at least one command stream marker (104). GPU 14 may be configured to receive the command stream, the command stream including one or more commands to be performed by GPU 14 and the at least one command stream marker, the at least one command stream marker indicating a workload type of the command stream (106), determine an operation algorithm for GPU 14 based on the at least one command stream marker prior to executing the command stream (108), and execute the command stream (110) based on the operation algorithm.

In one example, determining the operation algorithm comprises determining one or more preemption operations for GPU 14 based on the at least one command stream marker prior to executing the command stream. The at least one command stream marker may include one or more of an indication of a compute workload type, a 2D graphics rendering workload type, a 3D graphics workload type, a binning rendering workload type, or a direct rendering workload type.

In another example of the disclosure, GPU 14 may be configured to receive a preemption request and perform the one or more preemption operations in response to the preemption request. In one example, to perform the one or more preemption operations, GPU 14 is configured to execute the command stream to a safe point, save one or more results of executing the command stream to the safe point, execute another command stream related to the preemption request, and restart the command stream at the safe point. In another example, to perform the one or more preemption operations, GPU 14 is configured discard one or more results of executing the command stream, execute another command stream related to the preemption request, and restart the command stream at the beginning of the command stream.

As used in this disclosure, the term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B" or "A is the same as B").

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of data processing, the method comprising:
receiving, at a graphics processing unit (GPU), a command stream, the command stream including one or more commands to be performed by the GPU and at least one command stream marker, the at least one command stream marker indicating a workload type of the command stream, wherein the workload type is one or more of a compute workload type or a graphics workload type;
parsing, by the GPU, the at least one command stream marker from the command stream;
communicating, by the GPU, the at least one command stream marker to an operation algorithm selection unit of the GPU;
determining, by the operation algorithm selection unit of the GPU, an operation algorithm for preemption for the GPU based on the at least one command stream marker prior to executing the command stream;
receiving, by the GPU, a preemption request; and
performing, by the GPU, the operation algorithm for preemption in response to the preemption request, wherein performing the operation algorithm for preemption comprises:
execute the command stream to a safe point,
saving one or more results of executing the command stream to the safe point,
executing another command stream related to the preemption request, and
restarting the command stream at the safe point, or
performing the operation algorithm for preemption comprises:
discarding the one or more results of executing the command stream,
executing another command stream related to the preemption request, and
restarting the command stream at the beginning of the command stream.

2. The method of claim 1, further comprising:
generating, by a processor, the one or more commands;
generating, by the processor, the at least one command stream marker based on the one or more commands; and
generating, by the processor, the command stream to include the one or more commands and the at least one command stream marker.

3. The method of claim 1, wherein the at least one command stream marker includes one or more of an indication of the compute workload type, a 2D graphics rendering workload type, a 3D graphics workload type, a binning rendering workload type, or a direct rendering workload type.

4. The method of claim 1, further comprising:
determining, by the GPU, an operation algorithm for one or more of configuration optimization for rendering or power management.

5. The method of claim 1, wherein the operation algorithm for preemption comprises an instruction not to respond to the preemption request.

6. An apparatus configured to process data, the apparatus comprising:
a memory configured to store a command stream; and
a graphics processing unit (GPU) configured to:
receive the command stream, the command stream including one or more commands to be performed by the GPU and at least one command stream marker, the at least one command stream marker indicating a workload type of the command stream, wherein the workload type is one or more of a compute workload type or a graphics workload type;
parse the at least one command stream marker from the command stream;
communicate the at least one command stream marker to an operation algorithm selection unit of the GPU;
determine an operation algorithm for preemption for the GPU based on the at least one command stream marker prior to executing the command stream;
receive a preemption request; and
perform the operation algorithm for preemption in response to the preemption request, wherein to perform the operation algorithm for preemption, the GPU is configured to:
execute the command stream to a safe point,
save one or more results of executing the command stream to the safe point,
execute another command stream related to the preemption request, and restart the command stream at the safe point, or to perform the operation algorithm for preemption, the GPU is configured to:
- discard the one or more results of executing the command stream,
- execute another command stream related to the preemption request, and
- restart the command stream at the beginning of the command stream.

7. The apparatus of claim 6, further comprising:

a processor configured to:
- generate the one or more commands;
- generate the at least one command stream marker based on the one or more commands; and
- generate by the processor, the command stream to include the one or more commands and the at least one command stream marker.

8. The apparatus of claim 6, wherein the at least one command stream marker includes one or more of an indication of the compute workload type, a 2D graphics rendering workload type, a 3D graphics workload type, a binning rendering workload type, or a direct rendering workload type.

9. The apparatus of claim 6, wherein the GPU is further configured to determine an operation algorithm for one or more of configuration optimization for rendering or power management.

10. The apparatus of claim 6, wherein the operation algorithm for preemption comprises an instruction not to respond to the preemption request.

11. An apparatus configured for data processing, the apparatus comprising:
- means for receiving a command stream, the command stream including one or more commands to be performed by a graphics processing unit (GPU) and at least one command stream marker, the at least one command stream marker indicating a workload type of the command stream, wherein the workload type is one or more of a compute workload type or a graphics workload type;
- means for parsing the at least one command stream marker from the command stream;
- means for communicating the at least one command stream marker to an operation algorithm selection unit of the GPU;
- means for determining an operation algorithm for preemption for the GPU based on the at least one command stream marker prior to executing the command stream;
- means for receiving a preemption request; and
- means for performing the operation algorithm for preemption in response to the preemption request, wherein performing the operation algorithm for preemption comprises:
  - executing the command stream to a safe point,
  - saving one or more results of executing the command stream to the safe point,
  - executing another command stream related to the preemption request, and
  - restarting the command stream at the safe point, or performing the operation algorithm for preemption comprises:
- discarding the one or more results of executing the command stream,
- executing another command stream related to the preemption request, and
- restarting the command stream at the beginning of the command stream.

12. The apparatus of claim 11, further comprising:
- means for generating the one or more commands;
- means for generating the at least one command stream marker based on the one or more commands; and
- means for generating the command stream to include the one or more commands and the at least one command stream marker.

13. The apparatus of claim 11, wherein the at least one command stream marker includes one or more of an indication of the compute workload type, a 2D graphics rendering workload type, a 3D graphics workload type, a binning rendering workload type, or a direct rendering workload type.

14. The apparatus of claim 11, further comprising:
- means for determining an operation algorithm for one or more of configuration optimization for rendering or power management.

15. The apparatus of claim 11, wherein the operation algorithm for preemption comprises an instruction not to respond to the preemption request.

16. A non-transitory computer-readable storage medium storing instructions that, when executed, causes one or more processors to:
- receive a command stream, the command stream including one or more commands to be performed by a graphics processing unit (GPU) and at least one command stream marker, the at least one command stream marker indicating a workload type of the command stream, wherein the workload type is one or more of a compute workload type or a graphics workload type;
- parse the at least one command stream marker from the command stream;
- communicate the at least one command stream marker to an operation algorithm selection unit of the GPU;
- determine an operation algorithm for preemption for the GPU based on the at least one command stream marker prior to executing the command stream;
- receive a preemption request; and
- perform the operation algorithm for preemption in response to the preemption request, wherein to perform the operation algorithm for preemption, the instructions further cause the one or more processors to:
  - execute the command stream to a safe point,
  - save one or more results of executing the command stream to the safe point,
  - execute another command stream related to the preemption request, and
  - restart the command stream at the safe point, or to perform the operation algorithm for preemption, the instructions further cause the one or more processors to:
- discard the one or more results of executing the command stream,
- execute another command stream related to the preemption request, and
- restart the command stream at the beginning of the command stream.

17. The non-transitory computer-readable storage medium of claim 16, wherein the instructions further cause the one or more processors to:
- generate the one or more commands;
- generate the at least one command stream marker based on the one or more commands; and generate command stream to include the one or more commands and the at least one command stream marker.

18. The non-transitory computer-readable storage medium of claim 16, wherein the at least one command stream marker includes one or more of an indication of the compute workload type, a 2D graphics rendering workload type, a 3D graphics workload type, a binning rendering workload type, or a direct rendering workload type.

19. The non-transitory computer-readable storage medium of claim 16, wherein instructions further cause the one or more processors to determine an operation algorithm for one or more of configuration optimization for rendering or power management.

20. The non-transitory computer-readable storage medium of claim 16, wherein the operation algorithm for preemption comprises an instruction not to respond to the preemption request.

* * * * *